United States Patent
Yukawa

(10) Patent No.: US 10,040,322 B2
(45) Date of Patent: Aug. 7, 2018

(54) PNEUMATIC TIRE

(71) Applicant: SUMITOMO RUBBER INDUSTRIES, LTD., Kobe-shi, Hyogo (JP)

(72) Inventor: Naoki Yukawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 76 days.

(21) Appl. No.: 15/025,043

(22) PCT Filed: Oct. 28, 2014

(86) PCT No.: PCT/JP2014/078585
§ 371 (c)(1),
(2) Date: Mar. 25, 2016

(87) PCT Pub. No.: WO2015/072322
PCT Pub. Date: May 21, 2015

(65) Prior Publication Data
US 2016/0236521 A1 Aug. 18, 2016

(30) Foreign Application Priority Data
Nov. 18, 2013 (JP) .................... 2013-237662

(51) Int. Cl.
*B60C 15/00* (2006.01)
*B60C 15/06* (2006.01)
(Continued)

(52) U.S. Cl.
CPC .......... *B60C 15/0009* (2013.01); *B60C 5/142* (2013.01); *B60C 7/12* (2013.01);
(Continued)

(58) Field of Classification Search
CPC ....... B60C 15/0009; B60C 5/142; B60C 7/12; B60C 9/02; B60C 11/00; B60C 13/00; B60C 15/0036; B60C 15/0045; B60C 15/04; B60C 15/06
See application file for complete search history.

(56) References Cited

U.S. PATENT DOCUMENTS 5,988,247 A * 11/1999 Tanaka ................ B60C 9/18
152/517
2002/0003017 A1* 1/2002 Baumann ............. B60C 1/0025
152/517
(Continued)

FOREIGN PATENT DOCUMENTS

EP          EP 1970221 A1 *  9/2008  ............ B60C 5/142
JP          10-193914 A      7/1998
(Continued)

*Primary Examiner* — Jacob T Minskey
*Assistant Examiner* — Melody Tsui
(74) *Attorney, Agent, or Firm* — Birch, Stewart, Kolasch & Birch, LLP

(57) ABSTRACT

A run flat tire is provided having a line L1 connecting point P1 having height H1 of 17 mm; and point P2 at which a thickness from point P1 is minimum thickness Ts. Point C represents a point which is distant from point P2 on line L1 by a distance that is 0.4 times Ts. A point B represents a point of intersection of: line L2 that extends in the axial direction through radially outer end of core 36; and line L3 that extends in the radial direction through an axially outer end of core side portion 46a of turned-up portion 46. A line L4 passes through point C and point B. The thickness Ts is greater than or equal to 10 mm, and not greater than 17 mm. The turned-up portion 46 extends through a region surrounded by an axially outer surface of main portion 44, and lines L2-L4.

20 Claims, 6 Drawing Sheets

(51) Int. Cl.
  *B60C 17/00* (2006.01)
  *B60C 5/14* (2006.01)
  *B60C 7/12* (2006.01)
  *B60C 9/02* (2006.01)
  *B60C 11/00* (2006.01)
  *B60C 13/00* (2006.01)
  *B60C 15/04* (2006.01)

(52) U.S. Cl.
  CPC ............... *B60C 9/02* (2013.01); *B60C 11/00* (2013.01); *B60C 13/00* (2013.01); *B60C 15/0036* (2013.01); *B60C 15/0045* (2013.01); *B60C 15/04* (2013.01); *B60C 15/06* (2013.01); *B60C 15/0607* (2013.01); *B60C 17/0009* (2013.01); *B60C 2011/0025* (2013.01); *B60C 2013/006* (2013.01); *B60C 2015/009* (2013.01); *B60C 2015/061* (2013.01); *B60C 2015/0614* (2013.01); *B60C 2015/0621* (2013.01); *B60C 2017/0063* (2013.01)

(56) References Cited

U.S. PATENT DOCUMENTS

| | | |
|---|---|---|
| 2004/0112496 A1 | 6/2004 | Colantonio et al. |
| 2005/0006018 A1* | 1/2005 | Maruoka .................. B60C 3/04 152/454 |
| 2010/0116391 A1* | 5/2010 | Miyazaki .................. B60C 3/04 152/209.14 |
| 2010/0147439 A1 | 7/2010 | Koeune et al. |
| 2011/0030862 A1* | 2/2011 | Hayashi .............. B60C 11/0083 152/209.14 |
| 2011/0284143 A1 | 11/2011 | Horiuchi |
| 2013/0075003 A1 | 3/2013 | Horiuchi |
| 2014/0144565 A1 | 5/2014 | Yukawa |

FOREIGN PATENT DOCUMENTS

| | | |
|---|---|---|
| JP | 3312880 B2 | 8/2002 |
| JP | 2002-316519 A | 10/2002 |
| JP | 2004-306823 A | 11/2004 |
| JP | 2008-94116 A | 4/2008 |
| JP | 2009-137447 A | 6/2009 |
| JP | 2010-137853 A | 6/2010 |
| JP | 2011-121409 A | 6/2011 |
| JP | 2011-240895 A | 12/2011 |
| JP | 2012-96656 A | 5/2012 |
| JP | 2013-28300 A | 2/2013 |
| WO | WO 02/30688 A1 | 4/2002 |
| WO | WO 2005/044596 A1 | 5/2005 |
| WO | WO 2012/104196 A1 | 8/2012 |

* cited by examiner

PNEUMATIC TIRE

TECHNICAL FIELD

The present invention relates to pneumatic tires. More specifically, the present invention relates to run flat tires having load support layers in sidewalls.

BACKGROUND ART

In recent years, run flat tires having load support layers inside sidewalls have been developed. For the support layers, a highly hard crosslinked rubber is used. The run flat tire is referred to as a side-reinforcing type tire. In this type of run flat tire, if internal pressure is reduced due to puncture, load is supported by the support layer. The support layer inhibits flexure of the tire in a punctured state. Even if running is performed in the punctured state, the highly hard crosslinked rubber inhibits heat generation in the support layer. This run flat tire enables running over some distance even in the punctured state. An automobile having such run flat tires mounted thereon need not have a spare tire therein on a constant basis. The use of this run flat tire allows change of tires in an inconvenient place to be avoided.

When running with the run flat tire in a punctured state is continued, deformation and restoration of the support layer are repeated. Due to the repetition, separation between a bead apex and a carcass ply or damage thereof may occur. Ply loosing may occur between the bead apex and the carcass ply.

Patent Literature 1 discloses a run flat tire in which turned-up portions of a carcass ply, and a belt overlap each other. The carcass has a so-called "ultra-highly turned-up structure". The turned-up portions overlap the belt, so that generation of the ply loosing is inhibited. The carcass contributes to improvement of durability of the tire.

Patent Literature 2 discloses a tire in which a reinforcing filler layer is disposed axially outward of a bead apex. The tire includes the reinforcing filler layer, so that generation of the ply loosing is inhibited. The reinforcing filler layer also contributes to improvement of durability of the tire.

CITATION LIST

Patent Literature

Patent Literature 1: JP2013-28300
Patent Literature 2: Japanese Patent No. 3312880

SUMMARY OF THE INVENTION

Problems to be Solved by the Invention

A run flat tire includes a load support layer. In the tire, stiffness of sidewalls is high. In the run flat tire, a vertical stiffness constant is great. Further, the tire disclosed in Patent Literature 1 includes the carcass having a so-called "ultra-highly turned-up structure". The carcass causes further enhancement of the vertical stiffness constant of the tire. The tire disclosed in Patent Literature 1 tends to be poor in ride comfort.

In the tire disclosed in Patent Literature 2, turned-up portions of a carcass ply, and a belt do not overlap each other. In the tire, a vertical stiffness constant can be reduced as compared to the tire disclosed in Patent Literature 1. The reinforcing filler layer allows deterioration of ride comfort to be inhibited while enhancing durability of the tire. However, in running with the run flat tire in a punctured state, compressive stress may be generated in the carcass ply disposed axially outward of the bead apex. Also in the tire, damage and separation due to compressive stress may occur in the carcass ply layered axially outward of the bead apex. The reinforcing filler layer cannot sufficiently inhibit the damage and separation of the carcass ply. There is room for improvement in durability of the tire.

An object of the present invention is to provide a run flat tire excellent in both durability and ride comfort.

Solution to the Problems

A pneumatic tire according to the present invention includes: a tread having an outer surface that forms a tread surface; a pair of sidewalls that extend almost inward from ends, respectively, of the tread in a radial direction; a pair of clinches that extend almost inward, in the radial direction, from ends of the sidewalls, respectively; a pair of beads disposed inward of the clinches, respectively, in an axial direction; a carcass that is extended on and between one of the beads and the other of the beads along inner sides of the tread and the sidewalls; a pair of load support layers each disposed inward of the carcass in the axial direction and between the tread and the beads, respectively; and an inner liner joined to inner surfaces of the carcass and the load support layers.

Each bead includes a core, a first apex that extends outward from the core in the radial direction, and a second apex that is disposed outward of the first apex in the axial direction and that extends outward in the radial direction. The carcass includes a carcass ply. The carcass ply is turned up around the core from an inner side toward an outer side in the axial direction. By the carcass ply being turned up, the carcass ply has a main portion and turned-up portions. Each turned-up portion includes a core side portion layered over an axially outer side surface of the core, and an apex-layering portion layered between the first apex and the second apex.

A point P1 represents a point which is on an outer surface of each clinch and at which a height H1 from a bead base line is 17 mm. Ts represents a thickness at the point P1, the thickness representing a minimum thickness from the point P1 to an inner surface of the inner liner. A point P2 represents a point which is on the inner surface of the inner liner and at which the thickness Ts is obtained. L1 represents a straight line connecting between the point P1 and the point P2. A point C represents a point which is on the straight line L1 and which is distant from the point P2 by a distance that is 0.4 times the thickness Ts. A point B represents a point of intersection of: a straight line L2 that extends in the axial direction through a radially outer end of the core; and a straight line L3 that extends in the radial direction through an axially outer end of the core side portion of the turned-up portion. L4 represents a straight line that passes through the point C and the point B. In this case, the thickness Ts is greater than or equal to 10 mm, and not greater than 17 mm. Each turned-up portion extends outward from the core in the radial direction, through a region surrounded by an axially outer surface of the main portion, the straight line L2, the straight line L1, and the straight line L4.

Preferably, when a point D represents an end of the first apex in the radial direction, a ratio H2/Ht of a height H2 from the bead base line to the point D relative to a tire height Ht is greater than or equal to 0.15, and not greater than 0.40.

Preferably, a ratio E*c/E*s of a complex elastic modulus E*c of a crosslinked rubber of each clinch relative to a complex elastic modulus E*s of a crosslinked rubber of the second apex, is greater than or equal to 0.55, and not greater than 1.25.

Preferably, a ratio E*f/E*s of a complex elastic modulus E*f of a crosslinked rubber of the first apex relative to the complex elastic modulus E*s of the crosslinked rubber of the second apex is greater than or equal to 0.75, and not greater than 1.28.

Preferably, a complex elastic modulus E*r of a crosslinked rubber of each load support layer is greater than or equal to 5.0 MPa, and not greater than 13.5 MPa.

Preferably, the inner liner includes a center portion and a pair of end portions. The center portion extends from a radially outer side portion of an inner side surface of one of the load support layers to a radially outer side portion of an inner side surface of the other of the load support layers. The paired end portions each extend from a radially inner side portion of the inner side surface of a corresponding one of the load support layers to a portion axially inward of the first apex. The center portion and the end portions are discontinuously divided on the inner side surfaces of the load support layers.

Preferably, the tire includes chafers configured to contact with a rim. The core side portion and the apex-layering portion are continuous. Each chafer is layered over an axially outer side surface of a boundary portion between the core side portion and the apex-layering portion.

Advantageous Effects of the Invention

The run flat tire according to the present invention is excellent in durability, and allows deterioration of ride comfort to be inhibited.

DESCRIPTION OF EMBODIMENTS

The following will describe in detail the present invention based on preferred embodiments with reference where appropriate to the accompanying drawing.

Figure 1:
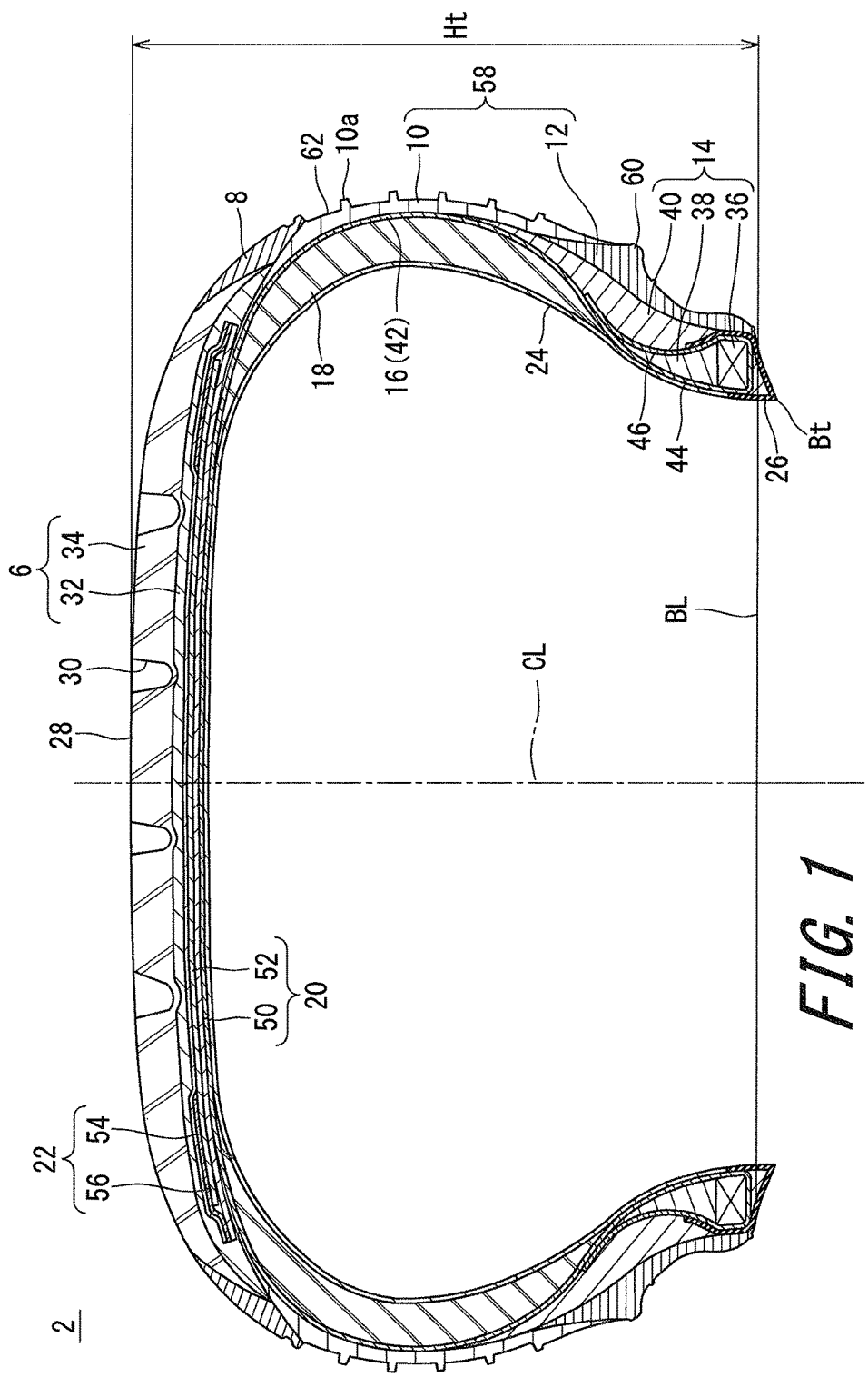
FIG. 1 is a cross-sectional view of a pneumatic tire according to an embodiment of the present invention.

FIG. 1 shows a pneumatic tire 2. In FIG. 1, the direction orthogonal to the surface of the sheet represents the circumferential direction of the tire 2, the left-right direction represents the axial direction of the tire 2, and the up-down direction represents the radial direction of the tire 2. In FIG. 1, an alternate long and short dash line CL represents an equator plane of the tire 2. A straight line BL represents a bead base line. The shape of the tire 2 except for a tread pattern is symmetric about the equator plane CL. The bead base line BL is a straight line that passes through bead diameter positions defined by the standard with which the tire 2 complies, and that extends in the axial direction of the tire 2.

The tire 2 includes a tread 6, wings 8, sidewalls 10, clinches 12, beads 14, a carcass 16, support layers 18 that serve as load support layers, a belt 20, a band 22, an inner liner 24, and chafers 26. The tire 2 is of a tubeless type. The tire 2 is mounted to passenger cars.

The tread 6 has a shape projecting outward in the radial direction. The tread 6 forms a tread surface 28 which can contact with a road surface. The tread surface 28 has grooves 30. The tread pattern is formed by the grooves 30. The tread 6 includes a base layer 32 and a cap layer 34. The cap layer 34 is disposed outward of the base layer 32 in the radial direction. The cap layer 34 is layered over the base layer 32. The base layer 32 is formed from a crosslinked rubber excellent in adhesion. A typical base rubber of the base layer 32 is a natural rubber. The cap layer 34 is formed from a crosslinked rubber that is excellent in wear resistance, heat resistance, and grip performance.

In FIG. 1, a double-headed arrow Ht represents a height of the tire 2. The height Ht is measured as a distance from the bead base line BL to the radially outer end of the tread surface 28. The height Ht is measured as a distance in a straight line in the radial direction. In the tire 2, the height Ht is measured as a distance from the bead base line BL to a point of intersection of the equator plane CL and the tread surface 28.

The wings 8 are disposed between the tread 6 and the sidewalls 10, respectively. The wings 8 are joined to the tread 6 and the sidewalls 10, respectively. The wings 8 are formed from a crosslinked rubber excellent in adhesion.

The sidewalls 10 extend from ends, respectively, of the tread 6 almost inward in the radial direction. The radially outer ends of the sidewalls 10 are joined to the tread 6 and the wings 8, respectively. The radially inner ends of the sidewalls 10 are joined to the clinches 12, respectively. The sidewalls 10 are formed from a crosslinked rubber excellent in cut resistance and weather resistance. The sidewalls 10 are disposed outward of the carcass 16 in the axial direction. The sidewalls 10 prevent damage of the carcass 16.

The clinches 12 are disposed almost inward of the sidewalls 10, respectively, in the radial direction. The clinches 12 are disposed outward of the beads 14 and the carcass 16 in the axial direction. The clinches 12 are formed from a crosslinked rubber excellent in wear resistance. When mounted to a not-illustrated rim, the clinches 12 contact with a flange of the rim.

The beads 14 are disposed inward of the sidewalls 10 in the radial direction. The beads 14 are disposed inward of the clinches 12 in the axial direction. Each bead 14 includes a core 36, a first apex 38, and a second apex 40.

The core 36 is ring-shaped, and includes a non-stretchable wound wire (typically, a steel wire). On the cross-section of the core 36, a plurality of the non-stretchable wires are aligned so as to be almost equally spaced from each other in the axial direction, and a plurality of the non-stretchable wires are also aligned so as to be almost equally spaced from each other in the radial direction. The aligned non-stretchable wires are covered by coating rubber. The cross-sectional shape of the core 36 is almost rectangular. The beads 14 have a strand bead structure. In the description herein, examples of the core having the strand bead structure include a core formed by one non-stretchable wire being wound. In other words, examples of the strand bead structure include a so-called single winding bead structure. The structure of the core 36 is not limited to the strand bead structure, and may be a so-called cable bead structure.

Figure 2:
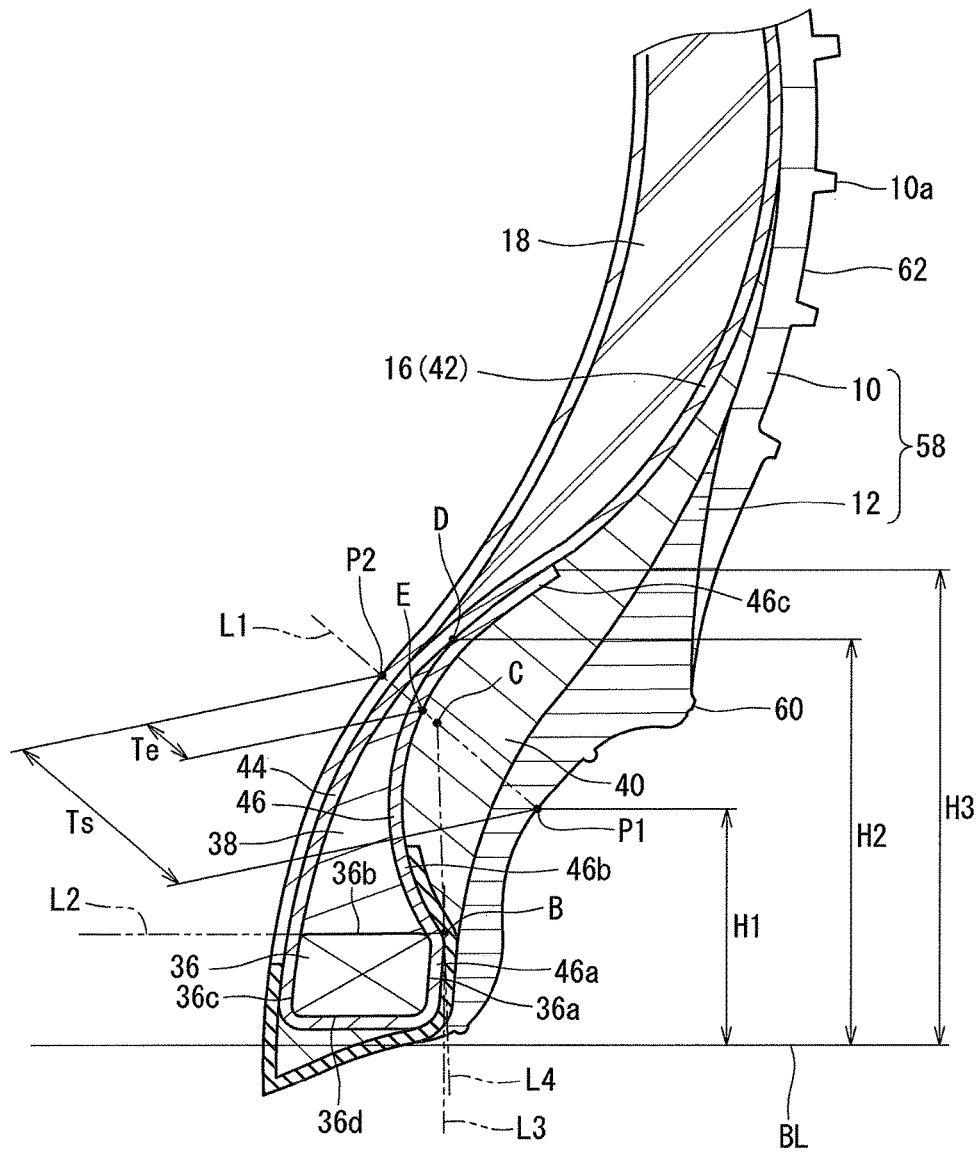
FIG. 2 is a partially enlarged view of the tire shown in FIG. 1

As shown in FIG. 2, the core 36 includes: an axially outer side surface 36a that faces outward in the axial direction; a radially outer side surface 36b that faces outward in the radial direction; an axially inner side surface 36c that faces inward in the axial direction; and a radially inner side surface 36d that faces inward in the radial direction. The axially outer side surface 36a and the radially outer side surface 36b are almost orthogonal to each other.

The first apex 38 extends radially outward from the core 36. The first apex 38 is tapered outward in the radial direction. The first apex 38 is formed from a highly hard crosslinked rubber.

The second apex 40 is disposed axially outward of the first apex 38 and the carcass 16. The second apex 40 is disposed between the carcass 16 and each clinch 12. The second apex 40 is joined to the clinch 12. The second apex 40 is tapered inward in the radial direction, and also tapered outward in the radial direction. The second apex 40 is formed from a highly hard crosslinked rubber.

The carcass 16 shown in FIG. 1 includes a carcass ply 42. The carcass ply 42 is extended on and between the beads 14 on both sides. The carcass ply 42 extends along the tread 6 and the sidewalls 10. The carcass ply 42 is turned up around the core 36 from the inner side toward the outer side in the axial direction. By the carcass ply 42 being turned up, the carcass ply 42 includes a main portion 44 and turned-up portions 46.

As shown in FIG. 2, each turned-up portion 46 is layered over the radially inner side surface 36d and the axially outer side surface 36a of the core 36, and turned up from the radially inner side surface 36d to the axially outer side surface 36a. Each turned-up portion 46 includes a core side portion 46a, an apex-layering portion 46b, and a ply-layering portion 46c. The core side portion 46a is layered over the axially outer side surface 36a of the core 36. The apex-layering portion 46b extends continuously from the core side portion 46a in the radially outward direction. The apex-layering portion 46b is layered between the first apex 38 and the second apex 40. The ply-layering portion 46c extends continuously from the apex-layering portion 46b, and layered over the main portion 44. In other words, in the tire 2, each turned-up portion 46 (apex-layering portion 46b) is layered between the first apex 38 and the second apex 40. The end portion of each turned-up portion 46 is the ply-layering portion 46c, and the ply-layering portion 46c is layered over the main portion 44.

Each turned-up portion 46 may include the core side portion 46a and the apex-layering portion 46b without including the ply-layering portion 46c. The end portion of each turned-up portion 46 may be the apex-layering portion 46b, and the apex-layering portion 46b may be disposed between the first apex 38 and the second apex 40. The apex-layering portion 46b may be disposed between the first apex 38 and each chafer 26.

The carcass ply 42 is formed by multiple cords aligned with each other, and a topping rubber, which is not shown. An absolute value of an angle of each cord relative to the equator plane ranges from 75 degrees to 90 degrees. In other words, the carcass 16 forms a radial structure. The cords are formed from an organic fiber. Preferable examples of the organic fiber include polyethylene terephthalate fibers, nylon fibers, rayon fibers, polyethylene naphthalate fibers, aramid fibers, and polyketone fibers.

As shown in FIG. 1, as the load support layer, the support layers 18 are disposed axially inward of the sidewalls 10. The support layers 18 are disposed axially inward of the carcass 16. The support layers 18 are disposed between the tread 6 and the beads 14, respectively, in the radial direction. The support layers 18 are disposed between the carcass 16 and the inner liner 24. Each support layer 18 is tapered inward in the radial direction, and also tapered outward in the radial direction. Each support layer 18 has a shape similar to a crescent shape. The support layers 18 are formed from a highly hard crosslinked rubber. When the tire 2 is punctured, the support layers 18 support load. The support layers 18 allow the tire 2 to run over some distance even in the punctured state. The tire 2 is also referred to as a run flat tire. The tire 2 is of a side-reinforcing type. The tire 2 may have a load support layer having a shape different from the shape of the support layer 18 shown in FIG. 1.

A portion, of the carcass 16, which overlaps each support layer 18 is separate from the inner liner 24. In other words, since the support layers 18 are provided, the carcass 16 is curved. In a punctured state, the support layers 18 are under compressive load, and a portion, of the carcass 16, which is close to each support layer 18 is under tensile load. Each support layer 18 is a lump of rubber, and can sufficiently bear the compressive load. The carcass 16 includes the cords, and can sufficiently bear the tensile load. The support layers 18 and the cords of the carcass 16 allow reduction of vertical flexure of the tire 2 in the punctured state. The tire 2 in which the vertical flexure is reduced is excellent in handling stability in the punctured state.

In the tire 2 in which a complex elastic modulus $E^*r$ of the crosslinked rubber of the support layer 18 is great, vertical flexure in a punctured state is reduced. In this viewpoint, the complex elastic modulus $E^*r$ of the support layer 18 is preferably greater than or equal to 5.0 MPa, more preferably greater than or equal to 6.0 MPa, and particularly preferably greater than or equal to 7.2 MPa. Meanwhile, the tire 2 in which the complex elastic modulus $E^*r$ of the crosslinked rubber of the support layer 18 is small, is excellent in ride comfort in a normal state. In this viewpoint, the complex elastic modulus $E^*r$ is preferably not greater than 13.5 MPa, more preferably not greater than 12.0 MPa, and particularly preferably not greater than 10.5 MPa.

The belt 20 is disposed inward of the tread 6 in the radial direction. The belt 20 is layered over the carcass 16. The belt 20 reinforces the carcass 16. The belt 20 includes an inner layer 50 and an outer layer 52. The width of the inner layer 50 is slightly greater than the width of the outer layer 52. Each of the inner layer 50 and the outer layer 52 includes multiple cords aligned with each other, and a topping rubber, which is not shown. Each cord is tilted relative to the equator plane. An absolute value of the tilt angle is typically greater than or equal to 10 degrees, and not greater than 35 degrees. A direction in which the cords of the inner layer 50 are tilted relative to the equator plane is opposite to a direction in which the cords of the outer layer 52 are tilted relative to the equator plane. A preferable material of the cords is a steel. An organic fiber may be used for the cords. The belt 20 may include three or more layers.

The band 22 includes a full band 54 and a pair of edge bands 56. The band 22 is disposed outward of the belt 20 in the radial direction. In the axial direction, the width of the full band 54 is almost equal to the width of the belt 20. The edge bands 56 are disposed on the end portions of the belt 20 in the axial direction. The edge bands 56 cover the radially outer side portions of both the axially end portions of the inner layer 50 and the axially end portions of the outer layer 52. Each of the full band 54 and the edge bands 56 includes a cord and a topping rubber, which are not shown.

The cord is helically wound. The full band 54 and the edge bands 56 each have a so-called jointless structure. The cords extend substantially in the circumferential direction. The angle of the cords relative to the circumferential direction is less than or equal to 5 degrees, and more preferably less than or equal to 2 degrees. The belt 20 is held by the cords, and lifting of the belt 20 is thus inhibited. The cords are formed from an organic fiber. Preferable examples of the organic fiber include nylon fibers, polyester fibers, rayon fibers, polyethylene naphthalate fibers, and aramid fibers.

The belt 20 and the band 22 form a reinforcing layer. The reinforcing layer may be formed by only the belt 20. The reinforcing layer may be formed by only the band 22.

The inner liner 24 is joined to inner surfaces of the carcass 16 and the support layers 18. The inner liner 24 is formed from a crosslinked rubber. A rubber excellent in air-tightness is used for the inner liner 24. An internal pressure of the tire 2 is maintained by the inner liner 24.

The chafers 26 are disposed near the beads 14. Each chafer 26 extends radially inward from a portion axially inward of the core 36, to reach a bead toe Bt. Each chafer 26 extends axially outward from the bead toe Bt through a portion radially inward of the core 36. The chafer 26 is layered over the core side portion 46a of each turned-up portion 46. Further, the chafer 26 is layered over the apex-layering portion 46b that extends upward in the radial direction. The end of each chafer 26 is disposed outward of the apex-layering portion 46b in the axial direction. The chafers 26 protect the turned-up portions 46, of the carcass ply 42, layered around the cores 36.

When the tire 2 is mounted on a rim, the chafers 26 contact with the rim. A region near each bead 14 is protected due to the contact. In the present embodiment, the chafers 26 are formed from a fabric and a rubber impregnated into the fabric. The chafers 26 may be formed integrally with the clinches 12. In this case, the material of the chafers 26 is the same as the material of the clinches 12.

A portion, of the tire 2, which includes the sidewall 10 and the clinch 12 is referred to as a side portion 58. The side portion 58 extends almost radially inward from each end of the tread 6. Each bead 14 is disposed axially inward of the side portion 58. Each side portion 58 includes a rib 60. The rib 60 is formed so as to project in the axial direction.

When the tire 2 is mounted on a rim, the rib 60 is disposed axially outward of the flange of the rim. The rib 60 projects axially outward from the end of the flange. The rib 60 prevents the flange of the rim from being damaged.

In the tire 2, a plurality of dimples 62 are formed in an outer surface 10a of each sidewall 10. The dimples 62 of the tire 2 are formed so as to be almost rectangular-recess-shaped such that the circumferential direction is the longitudinal direction of the dimples. The dimples 62 are aligned in the circumferential direction and the radial direction. The dimples 62 contribute to heat dissipation of the sidewalls 10. The shape of each dimple 62 is not limited to the rectangular shape, and may be a circular shape or another polygonal shape. Further, instead of or together with the dimples 62, fins may be formed.

A double-headed arrow H1 in FIG. 2 represents a height from the bead base line BL to a point P1 of the outer surface of the side portion 58 (clinch 12) of the tire 2. The height H1 is measured as a distance in a straight line in the radial direction. The point P1 is a point which is on the outer surface of the side portion 58 and at which the height H1 is 17 mm.

An alternate long and two short dashes line L1 in FIG. 2 represents a straight line that passes through the point P1 and a point P2. A double-headed arrow Ts represents a thickness of the tire 2 from the point P1 to the point P2. The point P2 is a point which is on the inner surface of the inner liner 24 and at which the thickness Ts represents a minimum value. The thickness Ts represents the minimum thickness of the tire 2 at the point P1.

An alternate long and two short dashes line L2 in FIG. 2 represents a straight line that extends in the axial direction through the radially outer end of the core 36. An alternate long and two short dashes line L3 represents a straight line that extends in the radial direction through the axially outer end of the core side portion 46a of the turned-up portion 46. A point B represents a point of intersection of the straight line L2 and the straight line L3. A point C is a point which is on the straight line L1 and which is distant from the point P2 by a distance that is 0.40 times the thickness Ts. An alternate long and two short dashes line L4 represents a straight line that passes through the point B and the point C. A point D represents the end of the first apex 38 in the radial direction. A double-headed arrow H2 represents a height from the bead base line BL to the point D. The height H2 represents the height of the first apex 38. A double-headed arrow H3 represents the height of the turned-up portion 46. The height H3 represents a distance from the bead base line BL to the radially outer end of the turned-up portion 46. The height H2 and the height H3 are each measured as a distance in a straight line in the radial direction. A point E represents a point of intersection of the straight line L1 and the inner surface of the second apex 40 in the axial direction. A double-headed arrow Te represents a distance from the point P2 to the point E.

Figure 3:
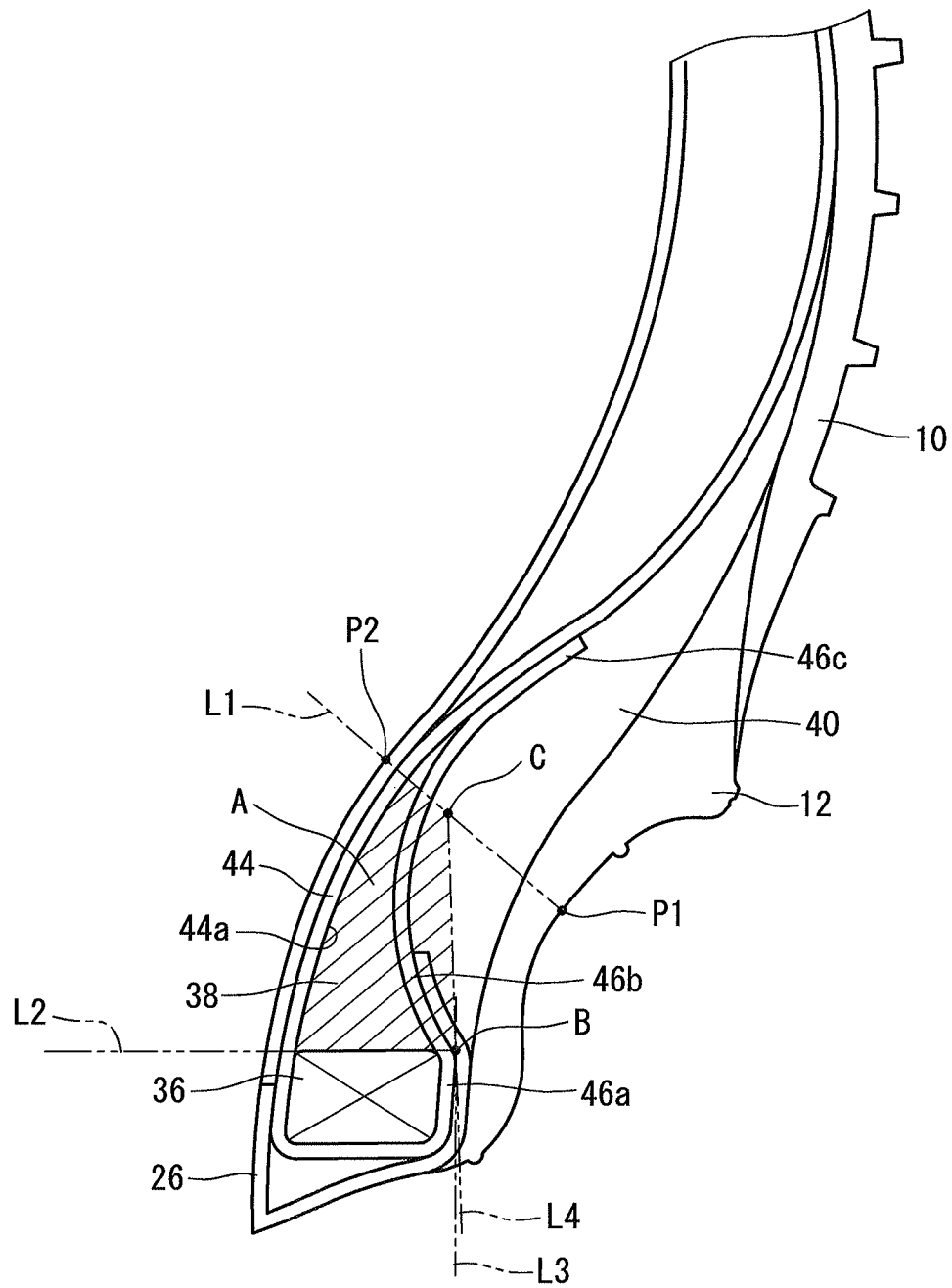
FIG. 3 illustrates a part of the tire shown in FIG. 1.

A region A indicated by diagonal lines in FIG. 3 is a region that is surrounded by an axially outer surface 44a of the main portion 44, the straight line L2, the straight line L1, and the straight line L4. In the tire 2, the apex-layering portion 46b of each turned-up portion 46 extends radially outward through the region A. A portion, of the apex-layering portion 46b, which is disposed between the straight line L2 and the straight line L1, extends through the region A. The apex-layering portion 46b extends and is curved, to form a curved line that projects in the axially inward direction.

Figure 4:
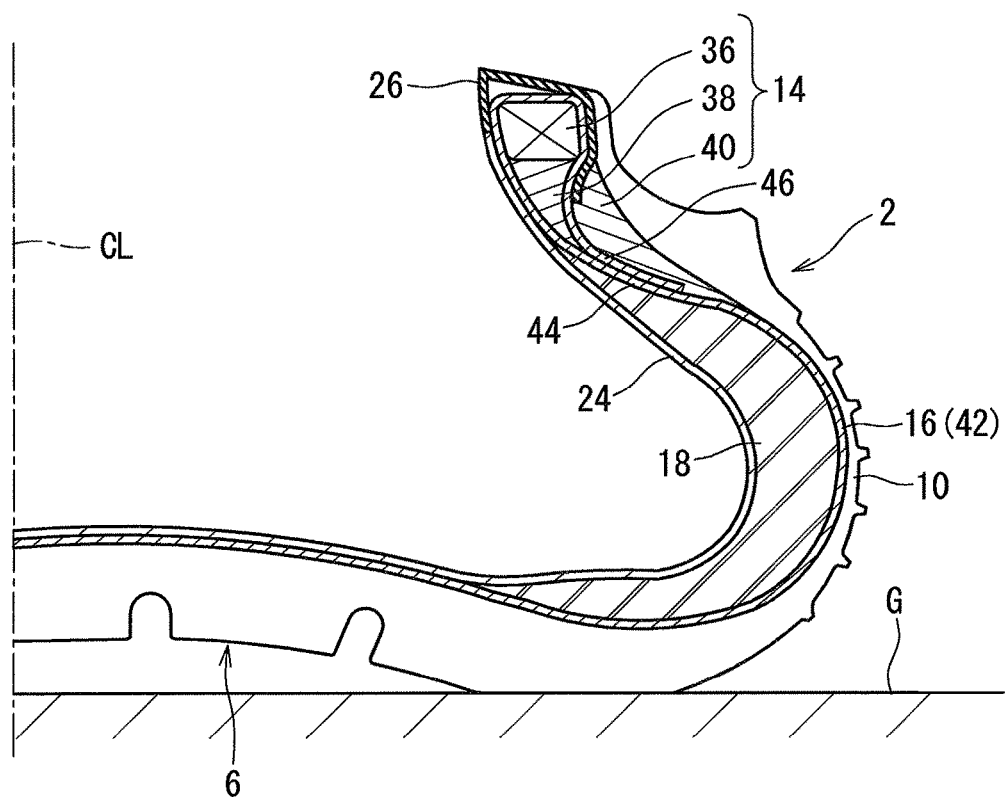
FIG. 4 illustrates a state where the tire shown in FIG. 1 is used.

FIG. 4 shows the tire 2 which is in a punctured state and with which running on a road surface G is performed. The center portion of the support layer 18 in the radial direction is greatly bent. In the center portion of the support layer 18 in the radial direction, the axially inner side portion is greatly compressed and deformed. The axially outer side portion is greatly expanded and deformed.

Meanwhile, in the bead 14, the axially inner side portion of the first apex 38 is greatly expanded and deformed. The axially outer side portion of the second apex 40 is greatly compressed and deformed. In the tire 2, each turned-up portion 46 is layered over the axially inner side portion of the second apex 40. Thus, damage and separation of the turned-up portions 46 are inhibited.

In particular, in the tire 2 with which running in a punctured state is performed, stress concentrates near the point 21 in FIG. 3. The position of the point 21 at which the stress concentrates is defined in association with the flange of the rim. The height H1 at the point 21 is not greatly changed if the size of the tire is changed. In the tire 2, the apex-layering portion 46b of each turned-up portion 46 extends through the region A. In the tire 2, each turned-up portion 46 extends through the axially inward portion near the point P1. Thus, influence of concentrating stress is reduced. Thus, damage and separation of the turned-up portions 46 are inhibited. Further, each turned-up portion 46 extends through the region A, whereby the turned-up portion 46 is greatly curved. The curving of the turned-up portions 46 also contributes to reduction of a vertical stiffness constant.

In these viewpoints, the position of the point C in FIG. 2 is set to be distant by 0.40 times the thickness Ts. In this viewpoint, a ratio Te/Ts of a distance Te from the point P1 to the point E, relative to the thickness Ts, is less than or equal to 0.40, preferably less than or equal to 0.33, and more preferably less than or equal to 0.25.

Meanwhile, in the tire 2 in which the distance Te is short, the first apex 38 becomes small. In the tire 2 in which the first apex 38 is small, stiffness is reduced. In this viewpoint, the ratio Te/Ts is greater than 0, more preferably not less than 0.25, and particularly preferably not less than 0.33.

In the tire 2, increase of the thickness Ts leads to enhancement of stiffness. The enhancement of stiffness contributes to improvement of durability. In this viewpoint, the thickness Ts is preferably greater than or equal to 10 mm, and more preferably greater than or equal to 13 mm. Meanwhile, in the tire 2 in which the thickness Ts is increased, a vertical stiffness constant is increased, and ride comfort is deteriorated. Further, in the tire 2 in which the thickness Ts is increased, the weight is increased. In these viewpoints, the thickness Ts is preferably not greater than 17 mm, and more preferably not greater than 15 mm.

In the tire 2 in which the height H2 from the bead base line to the point D is great, durability is improved. Meanwhile, the height of the first apex 38 is increased, and the core 36 and the first apex 38 are not easily attached to each other. In the tire 2 in which the height H2 is increased, productivity is reduced. In this viewpoint, the ratio H2/Ht is preferably less than or equal to 0.40. Meanwhile, also in the tire 2 in which the height H2 is reduced, the first apex 38 is not easily attached. In this viewpoint, the ratio H2/Ht is preferably not less than 0.15, and more preferably not less than 0.25.

In the tire 2, the clinches 12 are joined to the axially outer side portions of the second apexes 40. The second apex 40 and the clinch 12 are joined to each other. When a complex elastic modulus $E^*s$ of the crosslinked rubber of the second apex 40, and a complex elastic modulus $E^*c$ of the crosslinked rubber of the clinch are greatly different from each other, damage originating from a boundary between the second apex 40 and the clinch 12 is likely to occur. The tire 2 in which a difference between the complex elastic modulus $E^*s$ and the complex elastic modulus $E^*c$ is small, is excellent in durability. In this viewpoint, a ratio $E^*c/E^*s$ of the complex elastic modulus $E^*c$ to the complex elastic modulus $E^*s$ is preferably greater than or equal to 0.55, more preferably greater than or equal to 0.75, and particularly preferably greater than or equal to 0.90. In the same viewpoint, the ratio $E^*c/E^*s$ is preferably not greater than 1.25, more preferably not greater than 1.15, and particularly preferably not greater than 1.10.

In the tire 2, the first apex 38 and the second apex 40 are joined through the apex-layering portion 46b of each turned-up portion 46. In the tire 2, the first apex 38, the apex-layering portion 46b, and the second apex 40 are deformed integrally. When a complex elastic modulus $E^*f$ of the crosslinked rubber of the first apex 38 and the complex elastic modulus $E^*s$ of the crosslinked rubber of the second apex 40 are greatly different from each other, separation between each of the first apex 38 and the second apex 40, and the apex-layering portion 46b, and damage thereof are likely to occur. The tire in which a difference between the complex elastic modulus $E^*f$ and the complex elastic modulus $E^*s$ is small, is excellent in durability. In this viewpoint, the ratio $E^*f/E^*s$ is preferably greater than or equal to 0.75, more preferably greater than or equal to 0.80, and particularly preferably greater than or equal to 0.90. In the same viewpoint, the ratio $E^*f/E^*s$ is not greater than 1.28, more preferably not greater than 1.20, and particularly preferably not greater than 1.10.

Since the tire 2 has the dimples 62 formed therein, each sidewall 10 can have an increased surface area. The increased surface area allows increase of heat dissipation from the tire 2 into the air. The dimples 62 cause generation of turbulent flow around the tire 2. Due to the turbulent flow, heat dissipation from the tire 2 into the air is further increased. In the tire 2, temperature is less likely to rise. In the tire 2, damage of rubber members due to heat and separation between the rubber members due to heat are inhibited. The tire 2 having the dimples 62 formed therein is particularly excellent in durability.

As shown in FIG. 4, in the tire 2 which is in a punctured state and with which running on the road surface G is performed, the support layers 18 are repeatedly deformed. The repeated deformation causes the temperature of the tire 2 to rise. In the tire 2, the carcass 16 having the cords inhibits expansion and deformation of the support layers 18. The carcass 16 inhibits deformation of the support layers 18. In the viewpoint of inhibiting expansion and deformation at a high temperature, the cords of the carcass 16 are preferably formed from a rayon fiber, an aramid fiber, or a polyketone fiber.

In the tire 2, each chafer 26 is layered over a boundary portion between the core side portion 46b and the apex-layering portion 46b of each turned-up portion 46. The boundary portion is likely to be damaged due to repeated deformation. In the tire 2, the second apex extends so as to be tapered inward. The inner end of the second apex is disposed near the boundary portion. In the tire 2, in particular, the boundary portion is likely to be damaged due to repeated deformation. The chafer 26 covers the boundary portion. The chafer 26 reinforces the boundary portion.

In the present invention, the dimensions of the components of the tire 2 are measured on a cross-section cut from the tire 2 as shown in FIG. 1. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard, are included in the normal internal pressure.

In the present invention, the complex elastic modulus is measured in compliance with the standard of "JIS K 6394". The measurement conditions are as follows.

Viscoelasticity spectrometer: "VESF-3" manufactured by Iwamoto Seisakusho
Initial strain: 10%
Dynamic strain: ±1%
Frequency: 10 Hz
Deformation mode: tension
Measurement temperature: 70° C.

Figure 5:
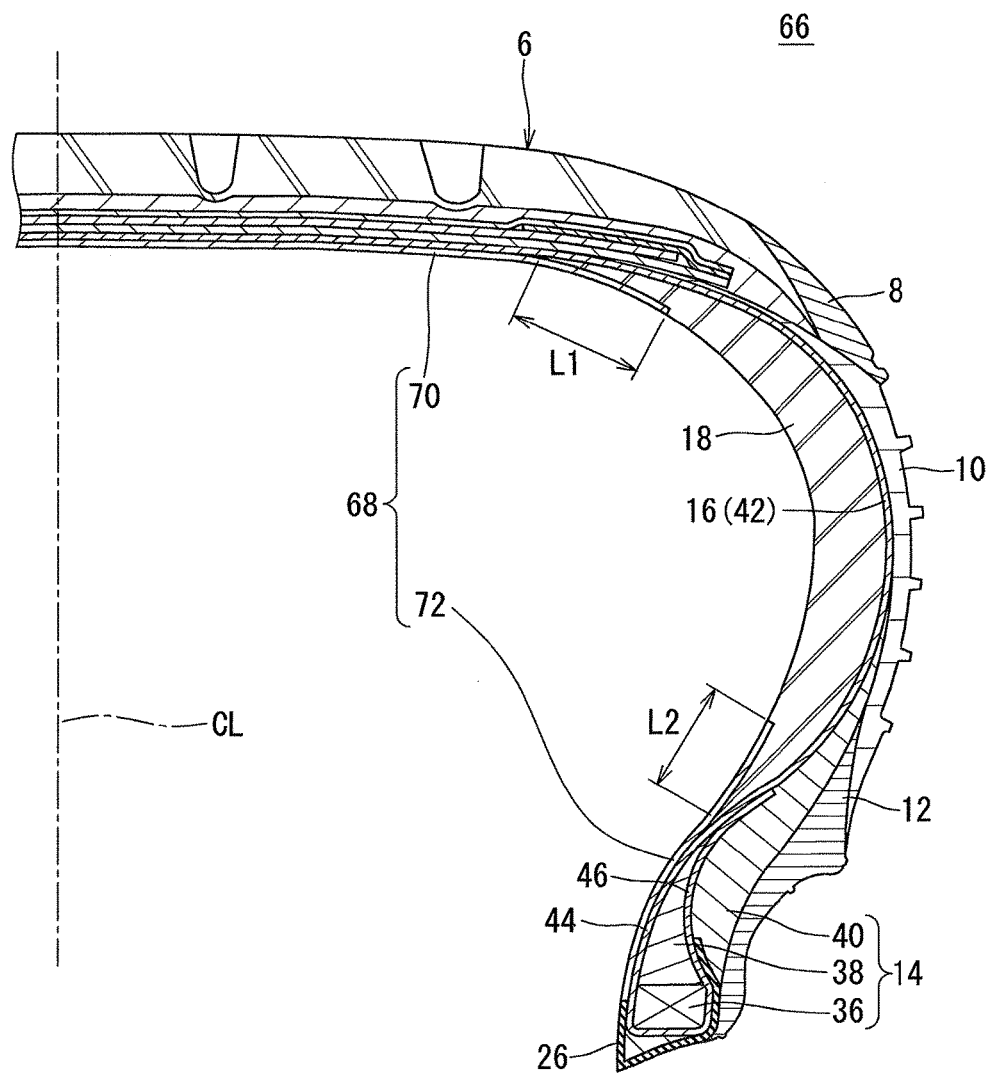
FIG. 5 is a cross-sectional view of a part of a pneumatic tire according to another embodiment of the present invention.

FIG. 5 shows a pneumatic tire 66 according to another embodiment of the present invention. The tire 66 includes an inner liner 68 instead of the inner liner 24 of the tire 2. The other components are the same as those of the tire 2. In the present embodiment, the same components as those of the tire 2 are not described. The components different from those of the tire 2 will be described. In the present embodiment, for the description, the same components as those of the tire 2 are denoted by the same reference numerals.

The inner liner 68 includes a center portion 70 and a pair of end portions 72. The center portion 70 is joined to a radially outer side portion of the inner side surface of one of the support layers 18, and a radially outer side portion of the inner side surface of the other of the support layers 18. The paired end portions 72 are joined to radially inner side portions of the inner side surfaces of the support layers 18, to reach the chafers 26, respectively. The center portion 70 and the end portions 72 are discontinuously divided on the inner side surfaces of the support layers 18. The divided inner liner 68 contributes to reduction of the weight of the tire 2 and reduction of a vertical stiffness constant. The tire 66 includes the support layers 18, whereby air tightness is sufficiently exhibited also by using the inner liner 68.

In FIG. 5, a double-headed arrow L1 represents an overlap portion in which each support layer 18 and the center portion 70 overlap each other. A double-headed arrow L2 represents an overlap portion in which the support layer 18 and the end portion 72 overlap each other. The overlap portion L1 and the overlap portion L2 are measured along the inner side surface of the support layer 18 on the cross-section shown in FIG. 5. When the overlap portions L1 and L2 each have a sufficient length, the inner liner 68 and the support layers 18 are integrated with each other, whereby increase of production process steps can be inhibited. In this viewpoint, each of the overlap portions L1 and L2 is preferably greater than or equal to 5 mm, and more preferably greater than or equal to 7 mm. Meanwhile, in the viewpoint of reducing the weight and a vertical stiffness constant as described above, each of the overlap portions L1 and L2 is preferably not greater than 20 mm, and more preferably not greater than 15 mm.

Similarly to the tire 2 shown in FIG. 4, also in the tire 66 with which running in a punctured state is performed, the axially inner side portion in the radially center portion of each support layer 18 is greatly compressed and deformed. The divided inner liner 68 allows influence of the great compression and deformation to be reduced. Thus, damage and separation of the inner liner 68 is inhibited. The divided inner liner 68 can contribute to improvement of durability of the tire 66.

Figure 6:
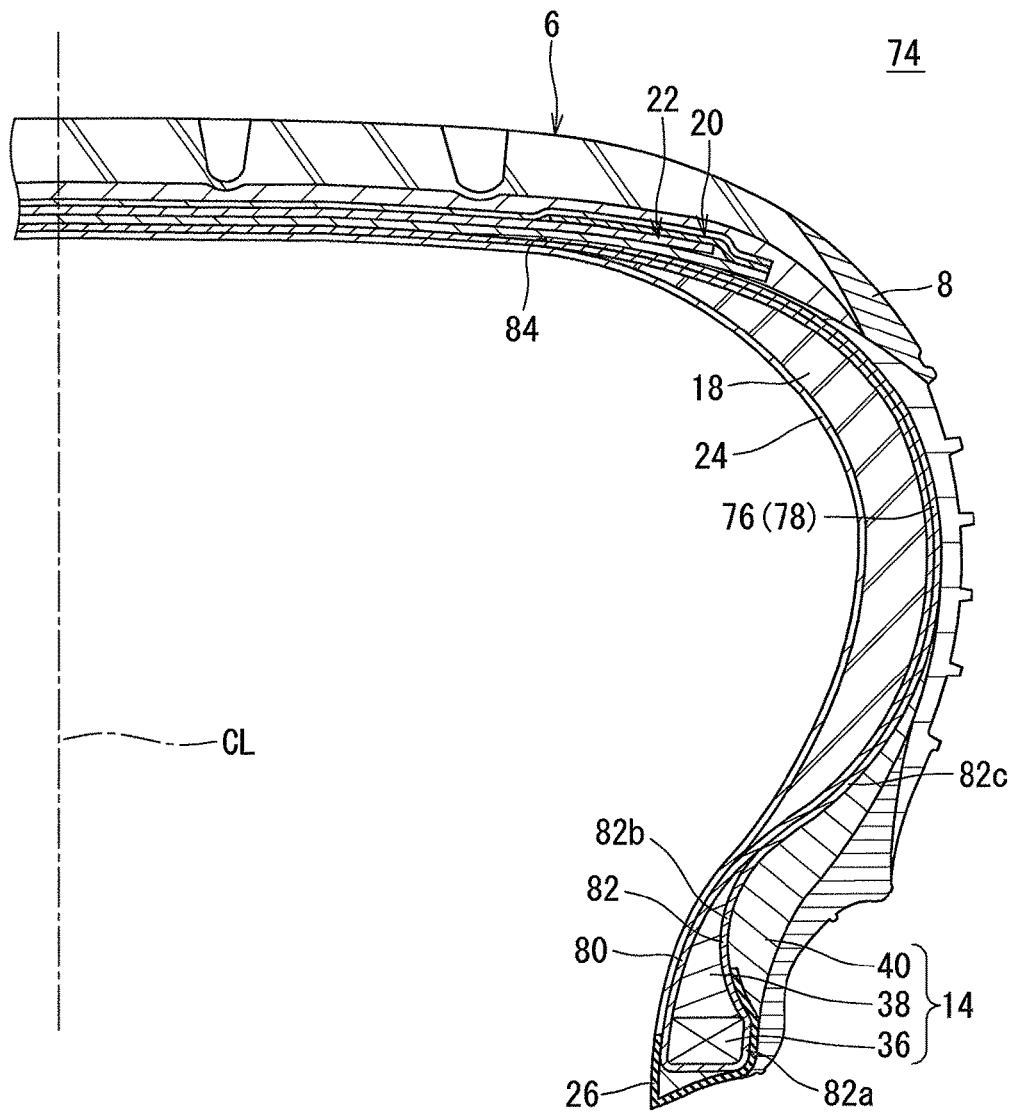
FIG. 6 is a cross-sectional view of a part of a pneumatic tire according to still another embodiment of the present invention.

FIG. 6 shows a part of a pneumatic tire 74 according to still another embodiment of the present invention. In the present embodiment, the same components as those of the tire 2 are not described. The components different from those of the tire 2 will be described. In the present embodiment, for the description, the same components as those of the tire 2 are denoted by the same reference numerals.

The tire 74 includes a carcass 76 instead of the carcass 16. The other components of the tire 74 are the same as those of the tire 2.

The carcass 76 includes a carcass ply 78. The carcass ply 78 is extended on and between the beads 14 on both sides. The carcass ply 78 is turned up around the core 36 from the inner side toward the outer side in the axial direction. By the carcass ply being turned up, the carcass ply 78 includes a main portion 80 and turned-up portions 82.

Each turned-up portion 82 is layered over the radially inner side surface 36d and the axially outer side surface 36a of the core 36, and turned up from the radially inner side surface 36d to the axially outer side surface 36a. Each turned-up portion 82 includes a core side portion 82a, an apex-layering portion 82b, and a ply-layering portion 82c. The core side portion 82a is layered over the axially outer side surface 36a of the core 36. The apex-layering portion 82b extends continuously from the core side portion 82a in the radially outward direction. The ply-layering portion 82c extends continuously from the apex-layering portion 82b, and layered over the main portion 44. An end 84 of the ply-layering portion 82c is disposed inward of the belt 22 in the radial direction. The end 84 of the ply-layering portion 82c is disposed between the main portion 44 and the belt 22. The carcass 76 has a so-called "ultra-highly turned-up structure".

In the tire 74, the apex-layering portion 82b extends through the region A (see FIG. 3). Thus, damage and separation of the turned-up portions 82 are inhibited. Further, the apex-layering portion 82b extends through the region A, whereby the apex-layering portion 82b is greatly curved. The curving of the turned-up portions 46 also contributes to reduction of a vertical stiffness constant. While the tire 74 includes the carcass 76, the tire 74 is excellent in both durability and ride comfort.

EXAMPLES

Hereinafter, effects of the present invention will become apparent according to examples. However, the present invention should not be restrictively construed based on the description of examples.

Example 1

A pneumatic tire (run flat tire) of Example 1 having the fundamental structure shown in FIG. 1 and FIG. 2 was obtained. The size of the tire was 235/55R18. In the sidewalls of the tire, the dimples were formed as shown in FIG. 1. The height H3, in the radial direction, of the turned-up portion of the carcass was 15 mm. The radially outer end of the turned-up portion was disposed between the first apex and the second apex. The radially outer end of the turned-up portion was disposed between the first apex and the chafer in the axial direction. The thickness Ts shown in FIG. 2, the ratio Te/Ts, the ratio H2/Ht, the complex elastic modulus E*f of the first apex, the complex elastic modulus E*s of the second apex, the complex elastic modulus E*c of the clinch, the complex elastic modulus E*r of the support layer (load support layer), the ratio E*c/E*s in the complex elastic modulus, and the ratio E*f/E*s in the complex elastic modulus, were as indicated in Table 1. For evaluating the tire, a rim in which the nominal rim width was "7J" was used.

Comparative Example 1

Comparative example 1 was a conventional run flat tire. In the tire, the turned-up portions of the carcass ply were turned up along the axially outer side of the apexes, which is not shown. The tire had a so-called "ultra-highly turned-up structure" in which the turned-up portions and the belt overlapped each other. The tire of comparative example 1 had the same structure as the tire of example 1 except that dimples were not provided, and the carcass, beads, and chafers were different.

Example 2

A tire was obtained in the same manner as for example 1 except that the sidewalls had no dimples.

Example 3

A tire having the fundamental structure as shown in FIG. 5 except that the sidewalls had no dimples, was obtained. The tire had the same structure as the tire of example 2 except that the tire of example 3 had the divided inner liner.

Examples 4 to 5 and Comparative Example 2

Tires were obtained in the same manner as for example 2 except that the ratio Te/Ts was as indicated below in Table 2.

Examples 6 to 7 and Comparative Examples 3 to 4

Tires were obtained in the same manner as for example 2 except that the thickness Ts and the ratio Te/Ts were as indicated below in Table 2.

Comparative Example 5 and Examples 8 to 10

Tires were obtained in the same manner as for example 2 except that the thickness Ts and the ratio H2/Ht were as indicated below in Table 3.

Examples 11 to 14

Tires were obtained in the same manner as for example 2 except that the complex elastic modulus E*c of the clinch was as indicated below in Table 4.

Examples 15 to 18

Tires were obtained in the same manner as for example 2 except that the complex elastic modulus E*s of the second apex was as indicated below in Table 5.

Examples 19 to 22

Tires were obtained in the same manner as for example 2 except that the complex elastic modulus E*r of the support layer was as indicated below in Table 6.

Examples 23 to 26

Tires were obtained in the same manner as for example 2 except that the height H3, in the radial direction, of the turned-up portion of the carcass was as indicated below in Table 7. In example 24, as shown in FIG. 6, the end portion of the turned-up portion was layered between the carcass ply and the belt.

[Evaluation of Vertical Stiffness]

A vertical stiffness constant of each tire was measured under the following conditions.
Used rim: Standard rim
Internal pressure: 200 kPa
Load: 80% of the maximum load that is specified in the JATMA The results are indicated below as indexes in Table 1 to Table 6 with the value of comparative example 1 being 100. The less the value is, the less the vertical stiffness is. The less the value is, the higher the evaluation is.

[Evaluation of Mass of Tire]

The mass of each tire was measured. The results are indicated below as indexes in Table 1 to Table 7 with the value of comparative example 1 being a reference value 0. The less the value is, the less the mass is. The less the value is, the higher the evaluation is.

[Evaluation of Durability (Run Flat)]

Durability in the case of each tire being punctured and internal pressure being reduced was evaluated as follows. The tire was mounted on a normal rim, and inflated with air. The tire was mounted to a drum type tire testing machine, and the vertical load of 5.2 kN was applied to the tire. Thereafter, the internal pressure of the tire was caused to become a normal pressure, and a punctured state was produced, and running with the tire on the drum having a radius of 1.7 m at a speed of 80 km/h was performed. A running distance until an abnormal sound was generated from the tire was measured. The results are indicated below as indexes in Table 1 to Table 6 with the value of comparative example 1 being 100. The greater the value is, the higher the evaluation is. In the boxes for damaged state, "support layer" represents damage of the load support layer. Similarly, "ply loosing" represents damage due to separation of the carcass ply, and "interface" represents damage on an interface of a boundary between different rubber members.

[Evaluation of Productivity]

A time required for producing the tires was measured. A time required for producing one tire was calculated according to the time required for producing the tires. Productivity was evaluated based on the reciprocal of the time required for producing one tire. The results are indicated below as indexes in Table 1 to Table 6 with a value of comparative example 1 being 100. The greater the value is, the better the productivity is.

TABLE 1

| | Evaluation result | | | |
| --- | --- | --- | --- | --- |
| | Comp. Ex. 1 | Ex. 1 | Ex. 2 | Ex. 3 |
| Fundamental structure | — | FIG. 1 | FIG. 1 | FIG. 5 |
| Dimple | Not provided | Provided | Not provided | Not provided |
| Ts (mm) | 15 | 15 | 15 | 15 |
| Ratio Te/Ts | 0.77 | 0.33 | 0.33 | 0.33 |
| Ratio H2/Ht | 0.40 | 0.25 | 0.25 | 0.25 |
| E*f (MPa) | 11.0 | 11.0 | 11.0 | 11.0 |
| E*s (MPa) | — | 11.0 | 11.0 | 11.0 |
| E*c (MPa) | 8.1 | 8.1 | 8.1 | 8.1 |
| E*r (MPa) | 10.5 | 10.5 | 10.5 | 10.5 |
| Ratio E*c/E*s | — | 0.74 | 0.74 | 0.74 |
| Ratio E*f/E*s | — | 1.00 | 1.00 | 1.00 |
| Vertical stiffness constant | 100 | 94 | 94 | 92 |
| Mass | 0 | −0.08 | −0.28 | −0.73 |
| Durability | 100 | 260 | 180 | 190 |
| Damaged state | Ply loosing | Support layer | Support layer | Support layer |
| Productivity | 100 | 97 | 97 | 95 |

TABLE 2

| | Ex. 4 | Ex. 5 | Comp. Ex. 2 | Comp. Ex. 3 | Ex. 6 | Ex. 7 | Comp. Ex. 4 |
|---|---|---|---|---|---|---|---|
| Fundamental structure | FIG. 1 | FIG. 1 | FIG. 1 | FIG. 1 | FIG. 1 | FIG. 1 | FIG. 1 |
| Dimple | Not provided | Not provided | Not provided | Not provided | Not provided | Not provided | Not provided |
| Ts (mm) | 15 | 15 | 15 | 20 | 17 | 10 | 8 |
| Ratio Te/Ts | 0.15 | 0.40 | 0.47 | 0.25 | 0.29 | 0.40 | 0.38 |
| Ratio H2/Ht | 0.25 | 0.25 | 0.25 | 0.25 | 0.25 | 0.25 | 0.25 |
| $E^*f$ (MPa) | 11.0 | 11.0 | 11.0 | 11.0 | 11.0 | 11.0 | 11.0 |
| $E^*s$ (MPa) | 11.0 | 11.0 | 11.0 | 11.0 | 11.0 | 11.0 | 11.0 |
| $E^*c$ (MPa) | 8.1 | 8.1 | 8.1 | 8.1 | 8.1 | 8.1 | 8.1 |
| $E^*r$ (MPa) | 10.5 | 10.5 | 10.5 | 10.5 | 10.5 | 10.5 | 10.5 |
| Ratio $E^*c/E^*s$ | 0.74 | 0.74 | 0.74 | 0.74 | 0.74 | 0.74 | 0.74 |
| Ratio $E^*f/E^*s$ | 1.00 | 1.00 | 1.00 | 1.00 | 1.00 | 1.00 | 1.00 |
| Vertical stiffness constant | 93 | 94 | 95 | 102 | 95 | 94 | 91 |
| Mass | −0.28 | −0.30 | −0.28 | 0.07 | −0.18 | −0.48 | −0.68 |
| Durability | 165 | 160 | 80 | 185 | 185 | 120 | 50 |
| Damaged state | Support layer | Support layer | Ply loosing | Support layer | Support layer | Support layer | Support layer |
| Productivity | 97 | 97 | 97 | 97 | 97 | 97 | 97 |

TABLE 3

| | Comp. Ex. 5 | Ex. 8 | Ex. 9 | Ex. 10 |
|---|---|---|---|---|
| Fundamental structure | FIG. 1 | FIG. 1 | FIG. 1 | FIG. 1 |
| Dimple | Not provided | Not provided | Not provided | Not provided |
| Ts (mm) | 20 | 17 | 15 | 15 |
| Ratio Te/Ts | 0.25 | 0.29 | 0.33 | 0.33 |
| Ratio H2/Ht | 0.04 | 0.15 | 0.40 | 0.46 |
| $E^*f$ (MPa) | 11.0 | 11.0 | 11.0 | 11.0 |
| $E^*s$ (MPa) | 11.0 | 11.0 | 11.0 | 11.0 |
| $E^*c$ (MPa) | 8.1 | 8.1 | 8.1 | 8.1 |
| $E^*r$ (MPa) | 10.5 | 10.5 | 10.5 | 10.5 |
| Ratio $E^*c/E^*s$ | 0.74 | 0.74 | 0.74 | 0.74 |
| Ratio $E^*f/E^*s$ | 1.00 | 1.00 | 1.00 | 1.00 |
| Vertical stiffness constant | 90 | 92 | 94 | 95 |
| Mass | −0.28 | −0.28 | −0.28 | −0.28 |
| Durability | 170 | 175 | 185 | 190 |
| Damaged state | support layer | Support layer | Support layer | Support layer |

TABLE 4

| | Ex. 11 | Ex. 12 | Ex. 13 | Ex. 14 |
|---|---|---|---|---|
| Fundamental structure | FIG. 1 | FIG. 1 | FIG. 1 | FIG. 1 |
| Dimple | Not provided | Not provided | Not provided | Not provided |
| Ts (mm) | 15 | 15 | 15 | 15 |
| Ratio Te/Ts | 0.33 | 0.33 | 0.33 | 0.33 |
| Ratio H2/Ht | 0.25 | 0.25 | 0.25 | 0.25 |
| $E^*f$ (MPa) | 11.0 | 11.0 | 11.0 | 11.0 |
| $E^*s$ (MPa) | 11.0 | 11.0 | 11.0 | 11.0 |
| $E^*c$ (MPa) | 4.2 | 6.1 | 13.8 | 16.2 |
| $E^*r$ (MPa) | 10.5 | 10.5 | 10.5 | 10.5 |
| Ratio $E^*c/E^*s$ | 0.38 | 0.55 | 1.25 | 1.47 |
| Ratio $E^*f/E^*s$ | 1.00 | 1.00 | 1.00 | 1.00 |
| Vertical stiffness constant | 91 | 93 | 96 | 99 |
| Mass | −0.28 | −0.28 | −0.28 | −0.28 |
| Durability | 120 | 170 | 180 | 120 |
| Damaged state | Interface | Support layer | Support layer | Interface |
| Productivity | 97 | 97 | 97 | 97 |

TABLE 5

| | Ex. 15 | Ex. 16 | Ex. 17 | Ex. 18 |
|---|---|---|---|---|
| Fundamental structure | FIG. 1 | FIG. 1 | FIG. 1 | FIG. 1 |
| Dimple | Not provided | Not provided | Not provided | Not provided |
| Ts (mm) | 15 | 15 | 15 | 15 |
| Ratio Te/Ts | 0.33 | 0.33 | 0.33 | 0.33 |
| Ratio H2/Ht | 0.25 | 0.25 | 0.25 | 0.25 |
| $E^*f$ (MPa) | 11.0 | 11.0 | 11.0 | 11.0 |
| $E^*s$ (MPa) | 6.0 | 8.6 | 14.7 | 17.9 |
| $E^*c$ (MPa) | 8.1 | 8.1 | 8.1 | 8.1 |
| $E^*r$ (MPa) | 10.5 | 10.5 | 10.5 | 10.5 |
| Ratio $E^*c/E^*s$ | 1.35 | 0.94 | 0.55 | 0.45 |
| Ratio $E^*f/E^*s$ | 1.83 | 1.28 | 0.75 | 0.61 |
| Vertical stiffness constant | 91 | 93 | 96 | 99 |
| Mass | −0.28 | −0.28 | −0.28 | −0.28 |
| Durability | 140 | 170 | 180 | 160 |
| Damaged state | Interface | Support layer | Support layer | Interface |
| Productivity | 97 | 97 | 97 | 97 |

TABLE 6

| | Evaluation result | | | |
|---|---|---|---|---|
| | Ex. 19 | Ex. 20 | Ex. 21 | Ex. 22 |
| Fundamental structure | FIG. 1 | FIG. 1 | FIG. 1 | FIG. 1 |
| Dimple | Not provided | Not provided | Not provided | Not provided |
| Ts (mm) | 15 | 15 | 15 | 15 |
| Ratio Te/Ts | 0.33 | 0.33 | 0.33 | 0.33 |
| Ratio H2/Ht | 0.25 | 0.25 | 0.25 | 0.25 |
| E*f (MPa) | 11.0 | 11.0 | 11.0 | 11.0 |
| E*s (MPa) | 11.0 | 11.0 | 11.0 | 11.0 |
| E*c (MPa) | 8.1 | 8.1 | 8.1 | 8.1 |
| E*r (MPa) | 3.0 | 5.0 | 13.5 | 17.0 |
| Ratio E*c/E*s | 0.74 | 0.74 | 0.74 | 0.74 |
| Ratio E*f/E*s | 1.00 | 1.00 | 1.00 | 1.00 |
| Vertical stiffness constant | 88 | 91 | 96 | 99 |
| Mass | −0.28 | −0.28 | −0.28 | −0.28 |
| Durability | 130 | 170 | 200 | 200 |
| Damaged state | Interface | Support layer | Support layer | Support layer |
| Productivity | 97 | 97 | 97 | 97 |

TABLE 7

| | Evaluation result | | | |
|---|---|---|---|---|
| | Ex. 23 | Ex. 24 | Ex. 25 | Ex. 26 |
| Fundamental structure | FIG. 6 | FIG. 1 | FIG. 1 | FIG. 1 |
| Height H3 (mm) | 109 | 75 | 35 | 15 |
| Dimple | Not provided | Not provided | Not provided | Not provided |
| Ts (mm) | 15 | 15 | 15 | 15 |
| Ratio Te/Ts | 0.33 | 0.33 | 0.33 | — |
| Ratio H2/Ht | 0.25 | 0.25 | 0.25 | 0.25 |
| E*f (MPa) | 11.0 | 11.0 | 11.0 | 11.0 |
| E*s (MPa) | 11.0 | 11.0 | 11.0 | 11.0 |
| E*c (MPa) | 8.1 | 8.1 | 8.1 | 8.1 |
| E*r (MPa) | 10.5 | 10.5 | 10.5 | 10.5 |
| Ratio E*c/E*s | 0.74 | 0.74 | 0.74 | 0.74 |
| Ratio E*f/E*s | 1.00 | 1.00 | 1.00 | 1.00 |
| Vertical stiffness constant | 96 | 95 | 94 | 94 |
| Mass | 0.00 | −0.20 | −0.28 | −0.30 |
| Durability | 200 | 190 | 180 | 175 |
| Damaged state | Support layer | Support layer | Support layer | Support layer |
| Productivity | 95 | 96 | 97 | 97 |

As indicated in Table 1 to Table 7, evaluation for the tires of examples is higher than evaluation for the tires of comparative examples. The evaluation results clearly indicate that the present invention is superior.

INDUSTRIAL APPLICABILITY

The tires described above are applicable to various vehicles.

DESCRIPTION OF THE REFERENCE CHARACTERS 2, 66, 74 . . . tire
6 . . . tread
10 . . . sidewall
12 . . . clinch
14 . . . bead
16, 76 . . . carcass
18 . . . support layer
24, 68 . . . inner liner
26 . . . chafer
36 . . . core
38 . . . first apex
40 . . . second apex
42, 78 . . . carcass ply
44, 80 . . . main portion
46, 82 . . . turned-up portion
62 . . . dimple
70 . . . center portion
72 . . . end portion

The invention claimed is:

1. A pneumatic tire comprising:
a tread having an outer surface that forms a tread surface;
a pair of sidewalls that extend almost inward from ends, respectively, of the tread in a radial direction;
a pair of clinches that extend almost inward, in the radial direction, from ends of the sidewalls, respectively;
a pair of beads disposed inward of the clinches, respectively, in an axial direction;
a carcass that is extended on and between one of the beads and the other of the beads along inner sides of the tread and the sidewalls;
a pair of load support layers each disposed inward of the carcass in the axial direction and between the tread and the beads, respectively;
chafers; and
an inner liner joined to inner surfaces of the carcass and the load support layers, wherein
each bead includes a core, a first apex that extends outward from the core in the radial direction, and a second apex that is disposed outward of the first apex in the axial direction and that extends outward in the radial direction,
the carcass includes a carcass ply, and the carcass ply is turned up around the core from an inner side toward an outer side in the axial direction, and, by the carcass ply being turned up, the carcass ply has a main portion and turned-up portions,
each turned-up portion includes a core side portion layered over an axially outer side surface of the core, and an apex-layering portion layered between the first apex and the second apex,
when a point P1 represents a point which is on an outer surface of each clinch and at which a height H1 from a bead base line is 17 mm,
Ts represents a thickness at the point P1, the thickness representing a minimum thickness from the point P1 to an inner surface of the inner liner,
a point P2 represents a point which is on the inner surface of the inner liner and at which the thickness Ts is obtained,
L1 represents a straight line connecting between the point P1 and the point P2,
a point C represents a point which is on the straight line L1 and which is distant from the point P2 by a distance that is 0.4 times the thickness Ts,
a point B represents a point of intersection of: a straight line L2 that extends in the axial direction through a radially outer end of the core; and a straight line L3 that extends in the radial direction through an axially outer end of the core side portion of the turned-up portion, and
L4 represents a straight line that passes through the point C and the point B,
the thickness Ts is greater than or equal to 10 mm, and not greater than 17 mm, each turned-up portion extends outward from the core in the radial direction, through a region surrounded by an axially outer surface of the main portion, the straight line L2, the straight line L1, and the straight line L4, the first apex is tapered outward in the radial direction, the second apex is tapered inward in the radial direction, when mounted to a rim, each clinch contacts with a flange of the rim, and each chafer contacts a bottom portion of the second apex.

2. The pneumatic tire according to claim 1, wherein when a point D represents an end of the first apex in the radial direction, a ratio H2/Ht of a height H2 from the bead base line to the point D relative to a tire height Ht is greater than or equal to 0.15, and not greater than 0.40.

3. The pneumatic tire according to claim 1, wherein a ratio $E^*c/E^*s$ of a complex elastic modulus $E^*c$ of a crosslinked rubber of each clinch relative to a complex elastic modulus $E^*s$ of a crosslinked rubber of the second apex, is greater than or equal to 0.55, and not greater than 1.25.

4. The pneumatic tire according to claim 1, wherein a ratio $E^*f/E^*s$ of a complex elastic modulus $E^*f$ of a crosslinked rubber of the first apex relative to the complex elastic modulus $E^*s$ of the crosslinked rubber of the second apex is greater than or equal to 0.75, and not greater than 1.28.

5. The pneumatic tire according to claim 1, wherein a complex elastic modulus $E^*r$ of a crosslinked rubber of each load support layer is greater than or equal to 5.0 MPa, and not greater than 13.5 MPa.

6. The pneumatic tire according to claim 1, wherein the inner liner includes a center portion and a pair of end portions, the center portion extends from a radially outer side portion of an inner side surface of one of the load support layers to a radially outer side portion of an inner side surface of the other of the load support layers, the paired end portions each extend from a radially inner side portion of the inner side surface of a corresponding one of the load support layers to a portion axially inward of the first apex, and the center portion and the end portions are discontinuously divided on the inner side surfaces of the load support layers.

7. The pneumatic tire according to claim 1, wherein the chafers are configured to contact with the rim, the core side portion and the apex-layering portion are continuous, and each chafer is layered over an axially outer side surface of a boundary portion between the core side portion and the apex-layering portion.

8. The pneumatic tire according to claim 2, wherein a ratio $E^*c/E^*s$ of a complex elastic modulus $E^*c$ of a crosslinked rubber of each clinch relative to a complex elastic modulus $E^*s$ of a crosslinked rubber of the second apex, is greater than or equal to 0.55, and not greater than 1.25.

9. The pneumatic tire according to claim 2, wherein a ratio $E^*f/E^*s$ of a complex elastic modulus $E^*f$ of a crosslinked rubber of the first apex relative to the complex elastic modulus $E^*s$ of the crosslinked rubber of the second apex is greater than or equal to 0.75, and not greater than 1.28.

10. The pneumatic tire according to claim 3, wherein a ratio $E^*f/E^*s$ of a complex elastic modulus $E^*f$ of a crosslinked rubber of the first apex relative to the complex elastic modulus $E^*s$ of the crosslinked rubber of the second apex is greater than or equal to 0.75, and not greater than 1.28.

11. The pneumatic tire according to claim 2, wherein a complex elastic modulus $E^*r$ of a crosslinked rubber of each load support layer is greater than or equal to 5.0 MPa, and not greater than 13.5 MPa.

12. The pneumatic tire according to claim 3, wherein a complex elastic modulus $E^*r$ of a crosslinked rubber of each load support layer is greater than or equal to 5.0 MPa, and not greater than 13.5 MPa.

13. The pneumatic tire according to claim 4, wherein a complex elastic modulus $E^*r$ of a crosslinked rubber of each load support layer is greater than or equal to 5.0 MPa, and not greater than 13.5 MPa.

14. The pneumatic tire according to claim 2, wherein the inner liner includes a center portion and a pair of end portions, the center portion extends from a radially outer side portion of an inner side surface of one of the load support layers to a radially outer side portion of an inner side surface of the other of the load support layers, the paired end portions each extend from a radially inner side portion of the inner side surface of a corresponding one of the load support layers to a portion axially inward of the first apex, and the center portion and the end portions are discontinuously divided on the inner side surfaces of the load support layers.

15. The pneumatic tire according to claim 3, wherein the inner liner includes a center portion and a pair of end portions, the center portion extends from a radially outer side portion of an inner side surface of one of the load support layers to a radially outer side portion of an inner side surface of the other of the load support layers, the paired end portions each extend from a radially inner side portion of the inner side surface of a corresponding one of the load support layers to a portion axially inward of the first apex, and the center portion and the end portions are discontinuously divided on the inner side surfaces of the load support layers.

16. The pneumatic tire according to claim 4, wherein the inner liner includes a center portion and a pair of end portions, the center portion extends from a radially outer side portion of an inner side surface of one of the load support layers to a radially outer side portion of an inner side surface of the other of the load support layers, the paired end portions each extend from a radially inner side portion of the inner side surface of a corresponding one of the load support layers to a portion axially inward of the first apex, and the center portion and the end portions are discontinuously divided on the inner side surfaces of the load support layers.

17. The pneumatic tire according to claim 5, wherein the inner liner includes a center portion and a pair of end portions, the center portion extends from a radially outer side portion of an inner side surface of one of the load support layers to a radially outer side portion of an inner side surface of the other of the load support layers, the paired end portions each extend from a radially inner side portion of the inner side surface of a corresponding one of the load support layers to a portion axially inward of the first apex, and the center portion and the end portions are discontinuously divided on the inner side surfaces of the load support layers.

18. The pneumatic tire according to claim 2, wherein
the chafers are configured to contact with the rim,
the core side portion and the apex-layering portion are continuous, and
each chafer is layered over an axially outer side surface of a boundary portion between the core side portion and the apex-layering portion.

19. The pneumatic tire according to claim 3, wherein
the chafers are configured to contact with the rim,
the core side portion and the apex-layering portion are continuous, and
each chafer is layered over an axially outer side surface of a boundary portion between the core side portion and the apex-layering portion.

20. The pneumatic tire according to claim 4, wherein
the chafers are configured to contact with the rim,
the core side portion and the apex-layering portion are continuous, and
each chafer is layered over an axially outer side surface of a boundary portion between the core side portion and the apex-layering portion.

* * * * *